(12) United States Patent
Kim et al.

(10) Patent No.: US 10,717,408 B1
(45) Date of Patent: Jul. 21, 2020

(54) SYSTEM AND METHOD FOR DETERMINING SEATBELT ROUTING

(71) Applicant: GM Global Technology Operations LLC, Detroit, MI (US)

(72) Inventors: Jaywan Kim, Rochester Hills, MI (US); Saravanakumar Nallaiah, Troy, MI (US); Greta L. Stuef, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/272,534

(22) Filed: Feb. 11, 2019

(51) Int. Cl.
| | |
|---|---|
| *B60R 22/48* | (2006.01) |
| *B60R 22/12* | (2006.01) |
| *G08B 21/22* | (2006.01) |
| *H04W 4/80* | (2018.01) |
| *B60R 22/08* | (2006.01) |
| *B60R 22/00* | (2006.01) |

(52) U.S. Cl.
CPC ............. *B60R 22/48* (2013.01); *B60R 22/12* (2013.01); *G08B 21/22* (2013.01); *H04W 4/80* (2018.02); *B60R 22/08* (2013.01); *B60R 2022/008* (2013.01); *B60R 2022/485* (2013.01); *B60R 2022/4866* (2013.01)

(58) Field of Classification Search
CPC ......... B60R 22/08; B60R 22/12; B60R 22/48; B60R 2022/008; B60R 2022/4825; B60R 2022/485; B60R 2022/4858; B60R 2022/4866; B60R 16/037; B60N 2/002; H04W 4/80; G08B 21/22
See application file for complete search history.

(56) References Cited

U.S. PATENT DOCUMENTS

| | | | |
|---|---|---|---|
| 9,878,689 B1 * | 1/2018 | Jimenez | B60R 22/48 |
| 10,137,856 B1 * | 11/2018 | Jimenez | B60R 22/48 |
| 2009/0112408 A1 * | 4/2009 | Kankanala | B60R 22/48 |
| | | | 701/45 |
| 2009/0132128 A1 * | 5/2009 | Marriott | B60R 22/48 |
| | | | 701/45 |
| 2009/0160616 A1 * | 6/2009 | Messner | G08C 17/02 |
| | | | 340/10.1 |
| 2017/0240066 A1 * | 8/2017 | Wang | B60N 2/002 |
| 2019/0152430 A1 * | 5/2019 | Thomas | B60R 22/48 |

* cited by examiner

*Primary Examiner* — Orlando Bousono

(57) ABSTRACT

A system for determining seatbelt routing. The system includes a seatbelt retractor, a guide loop, a seatbelt latchplate, a seatbelt buckle, a seatbelt buckle sensor, a first RFID tag, RFID reader, and a control module. The seatbelt retractor stores a length of seatbelt webbing. The guide loop changes a routing direction of the seatbelt webbing. The seatbelt latchplate is engaged with the seatbelt webbing. The seatbelt buckle is secured to the motor vehicle and engages the latchplate. The seatbelt buckle sensor for detects the presence of the latchplate in the seatbelt buckle. The first RFID tag is attached to the seatbelt webbing of the seatbelt. The RFID reader detects the presence of the first RFID tag. The control module determines the seatbelt routing based on whether the seatbelt is buckled and the detection of the first RFID tag by the RFID reader.

16 Claims, 3 Drawing Sheets

SYSTEM AND METHOD FOR DETERMINING SEATBELT ROUTING

INTRODUCTION

The present disclosure relates to seatbelt systems and methods for detecting seatbelt webbing routing.

Seatbelt systems for restraining occupants in a motor vehicle, generally, employ seatbelt retractors. The seatbelt retractors have a spool around which a seatbelt webbing is wound. The seatbelt webbing may be unwound from the spool by a vehicle occupant and secured around the vehicle occupant by inserting a latch plate coupled to the seatbelt webbing into a seatbelt buckle. When not in use the seatbelt retractor through the aid of a spring retracts the seatbelt webbing into the retractor. Moreover, seatbelt systems have employed a sensor in the seatbelt buckle to determine whether an occupant is belted. If the occupant is unbelted a warning is provided to the occupant to prompt the occupant to buckle their seatbelt.

Thus, while current seatbelt systems achieve their intended purpose, there is a need for a new and improved system and method for securing vehicle occupants with a seatbelt. The new and improved method should be capable of determining seatbelt routing and provide a message to the vehicle occupant when an improper seatbelt routing is detected.

SUMMARY

According to several aspects, a system for determining the seatbelt routing of a seatbelt system for a motor vehicle is provided. The system includes a seatbelt retractor for releasably storing a length of seatbelt webbing, a guide loop for changing a routing direction of the seatbelt webbing, a seatbelt latchplate slidably engaged with the seatbelt webbing, a seatbelt buckle secured to the motor vehicle for releasably engaging the latchplate, a seatbelt buckle sensor for detecting the presence of the latchplate in the seatbelt buckle, a first RFID tag attached to the seatbelt webbing of the seatbelt, an RFID reader attached to a structural member of the motor vehicle for detecting the presence of the first RFID tag on the seatbelt webbing, and a control module for determining seatbelt routing based on whether the seatbelt is buckled and the detection of the first RFID tag by the RFID reader.

In accordance with another aspect of the present disclosure, a lap belt portion of the seatbelt webbing is defined as the portion of seatbelt webbing extending between a terminal end of the seatbelt webbing and the latchplate and a shoulder belt portion of the seatbelt webbing is defined as the portion of the seatbelt webbing extending between the guide loop and the latchplate.

In accordance with yet another aspect of the present disclosure, the first RFID tag is attached to the lap belt portion of the seatbelt webbing.

In accordance with still another aspect of the present disclosure, a second RFID tag is attached to a shoulder belt portion of the seatbelt webbing.

In accordance with yet another aspect of the present disclosure, the first RFID tag has a first RFID identifier associated with the first RFID tag and the second RFID tag has a second RFID identifier associated with the second RFID tag.

In accordance with yet another aspect of the present disclosure, the RFID reader is attached to an interior roof of the motor vehicle.

In accordance with yet another aspect of the present disclosure, an occupant sensor for determining the presence of an occupant in the vehicle seat.

In accordance with yet another aspect of the present disclosure, the control module executes instructions to determine whether the first RFID is detected.

In accordance with yet another aspect of the present disclosure, the control module executes instructions to determine whether the second RFID is detected.

In accordance with yet another aspect of the present disclosure, the control module executes instructions to take an action when the first RFID is not detected.

In accordance with yet another aspect of the present disclosure, the action is an audible or visual message to the vehicle occupant.

In accordance with yet another aspect of the present disclosure, the control module executes instructions to determine whether the first and second RFID tags are detected.

In accordance with yet another aspect of the present disclosure, the control module executes instructions to sense the presence of the first RFID tag.

In accordance with yet another aspect of the present disclosure, the control module executes instructions to determine that the seatbelt is on the lap of on an occupant when the presence of the first RFID tag is detected.

In accordance with yet another aspect of the present disclosure, the control module executes instructions to determine that the seatbelt is on the shoulder of on an occupant when the presence of the second RFID tag is detected.

In accordance with yet another aspect of the present disclosure, a method for detecting a seatbelt routing in a motor vehicle seatbelt system is provided. The method includes sensing a presence of occupant in a vehicle seat, determining whether the occupant is detected in the vehicle seat, sensing a presence of a seatbelt latchplate in the seatbelt buckle when an occupant is determined to be present in the vehicle seat, determining whether the seatbelt is buckled, sensing a presence of a first RFID tag attached to the seatbelt, and determining seatbelt routing based on whether the seatbelt is buckled, an occupant is present, and the determined location of the first RFID tag.

In accordance with yet another aspect of the present disclosure, the method further includes determining the location of the first RFID tag on the seatbelt.

In accordance with yet another aspect of the present disclosure, the method further includes determining the location of the second RFID tag on the seatbelt.

In accordance with yet another aspect of the present disclosure, the method further includes determining the seatbelt routing is proper when the first and second RFID tags are detected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
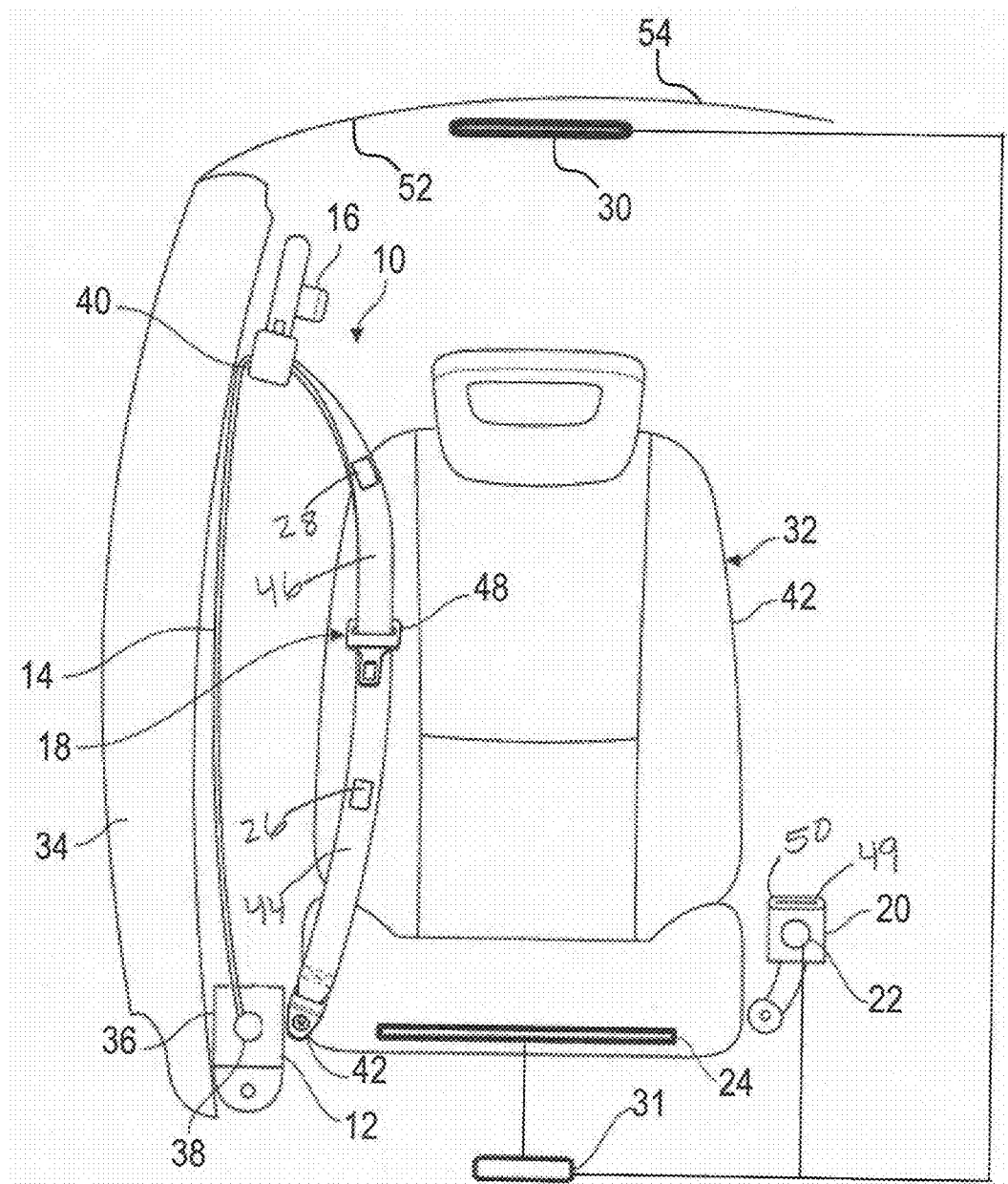
FIG. 1 is a front perspective view of a vehicle seat and a seatbelt system, according to an exemplary embodiment.

Referring to FIG. 1, a seatbelt system 10 for a motor vehicle is illustrated, in accordance with an embodiment of the invention. Seatbelt system 10 includes a seatbelt retractor 12, a seatbelt webbing 14, a guide loop 16, a latchplate 18, a buckle 20, a seatbelt buckle sensor 22, an occupant sensor 24, a first radio-frequency identification (RFID) tag 26, a second RFID tag 28 and an RFID tag reader 30 and a control module 31. Seatbelt retractor 12 is fixed to a structural member of the motor vehicle adjacent a vehicle seat 32. For example, seatbelt retractor 12 is bolted to the base of the B-pillar 34 or other structural member of the vehicle. Alternatively, the seat belt retractor 12 may be integrated with and fixedly attached to the base of the seat 32 of the motor vehicle. A frame 36 of seatbelt retractor 12 is configured to rotatably support a spool 38 for free rotation in the retractor 12.

A spring (not shown) is operatively attached to the retractor frame 36 at one end of the spring and to the spool 38 at another end of the spring to retract the seatbelt webbing 14 onto the spool 38 and into the retractor 12. The seatbelt webbing 14 is at least partially wound around the spool 38 for storing the seatbelt webbing 14 in the retractor 12 when the seatbelt system 10 is not in use. When the seatbelt system 10 is in use the seatbelt webbing 14 is unwound from the spool 38 and pulled out of the retractor 12 by a vehicle occupant. The seatbelt webbing 14 is typically made of a woven fabric material such as woven nylon or polyester.

Guide loop 16 is fixedly secured to the motor vehicle, generally, towards the top of the B-pillar 34 of the motor vehicle. A slot 40 is provided in guide loop 16 that receives and slidably engages the seatbelt webbing 14. The seatbelt webbing 14 generally extends from the retractor 12 up and along the B-pillar 34 and is threaded or routed through guide loop 16 where the seatbelt webbing 14 is directed down toward the base of the seat 32 and is secured at a terminal end 42 to a structural member of the motor vehicle or to the seat 32. A lap portion 44 of the seatbelt webbing is defined as the length of seatbelt webbing that extends between the terminal end 42 of the seatbelt webbing 14 and the latchplate 18. A shoulder portion 46 of the seatbelt webbing is defined as the length of seatbelt webbing that extends between the guide loop 16 and the latchplate 18.

The latchplate 18 has a slot 48 through which the seatbelt webbing 14 is threaded to slidably engage the latchplate 18 with the seatbelt webbing 14. The latchplate 18 is located on the seatbelt webbing 14, generally, between the guide loop 16 and the terminal end 42 of the seatbelt webbing 14. The buckle 20 is configured to releasably capture or engage the latchplate 18. Typically, latchplate 18 is pressed into a slot 49 in buckle 20. After the latchplate 18 is fully inserted into the buckle 20 the latchplate 18 is locked or engaged to the buckle 20. A button 50 on the buckle 20 is depressed to release the latchplate 18 from buckle 20.

The seatbelt buckle sensor 22 is provided in the seatbelt buckle 20. Buckle sensor 22 is configured to sense the presence of the latchplate 18. Buckle sensor 22 transmits a control signal to the control module 31. The control module 31 includes a control algorithm that receives the control signal from the buckle sensor 22 and determines whether the latchplate 18 is present in the seatbelt buckle 20.

An occupant sensor 24 is provided in the vehicle seat 32 or adjacent the vehicle seat 32. Occupant sensor 24 assess occupant presence via different means such as one or more pressure pads, weight pads, load cells, resistive pads and biometric sensors. Occupant sensor 24 transmits a control signal to the control module 31. The control module 31 includes a control algorithm that receives the control signal from the occupant sensor 24 and determines whether an occupant is present in the seat 32.

The first RFID tag 26 is fixed to the lap belt portion 44 of the seatbelt webbing 14. The second RFID tag 28 is fixed to the shoulder belt portion 46 of the seatbelt webbing 14. The RFID tag reader 30 is secured to an interior surface 52 of the vehicle roof 54. Digital data encoded in RFID tags 26, 28 are captured by the RFID reader 30 via radio waves emitted by the RFID reader 30.

RFID tags 26, 28 are either passive, active or battery-assisted passive (BAP). The active RFID tag has an on-board battery and periodically transmits an ID signal to the RFID reader 30. The BAP RFID tag has a small battery on board and is activated when in the presence of the RFID reader 30. The passive RFID tag has no battery and, thus, a passive RFID tag is less expensive and smaller than a BAP RFID tag. The passive RFID tag uses the radio energy transmitted by the RFID tag reader 30 to transmit an RFID signal back to the RFID tag reader 30.

RFID tags 26, 28 are read-only and have a pre-assigned serial numbers that are used as identifiers. The RFID tags 26, 28 include three parts: an integrated circuit that stores and processes information and that modulates and demodulates radio-frequency (RF) signals transmitted by the reader 30; a means of collecting DC power from the incident reader signal; and an antenna for receiving and transmitting the signal. The RFID tag information is stored in a non-volatile memory. The RFID reader 30 transmits an encoded radio signal to interrogate the RFID tags 26, 28. The RFID tags 26, 28 receive the encoded radio signal and then responds with the RFID identifier associated with either first RFID tag 26 or second RFID tag 28. The RFID identifier is a unique tag serial number associated with the RFID tag. Since RFID tags 26, 28 have individual serial numbers, the control module 31 can discriminate between tags 26, 28 that are within the range of the RFID reader 30 and read tags 26, 28 simultaneously.

The control module 31 includes a control algorithm that receives the control signal from the seatbelt buckle sensor 22, occupant sensor 24, RFID tag reader 30 and determines whether an occupant is properly seatbelted in the vehicle seat 34. A properly seatbelted occupant is determined by control module 31 when the occupant sensor 24 senses the presence of an occupant, the seatbelt buckle sensor 22 senses the presence of the latchplate 18, and the RFID reader 30 receives a signal from the first and second RFID tags 26, 28. An improperly seatbelted occupant is determined by control module 31 when the occupant sensor 24 senses the presence of an occupant, the seatbelt buckle sensor 22 senses the presence of the latchplate 18, and the RFID reader 30 does not receive a signal from one or both of the first and second RFID tags 26, 28.

Figure 2:
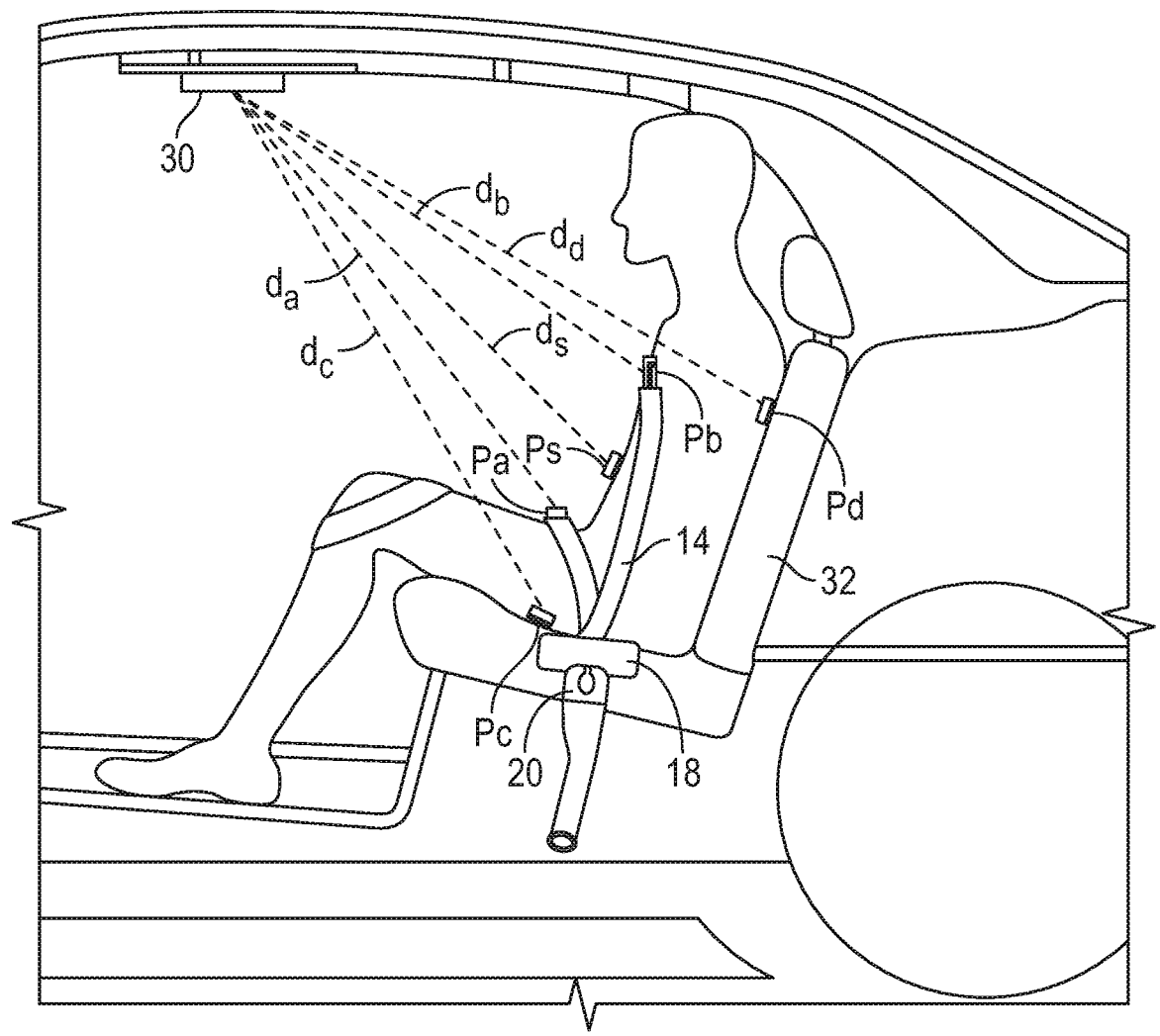
FIG. 2 is a side view of a vehicle interior illustrating the different positions the first and second RFID tags relative to the occupant and the vehicle seat, according to an exemplary embodiment.

Referring now to FIG. 2, a schematic diagram illustrating the positions of the first and second RFID tags 26, 28 relative to the RFID reader 30 and the occupant sitting in the vehicle seat 32, in accordance with the present invention. A properly seatbelted occupant will be determined by the control module 31 when the first RFID tag 26 is located on top of an occupant's lap or, in other words, the first RFID tag 26 is positioned between the RFID reader 30 and the vehicle occupant as designated by reference $P_a$ and the second RFID tag 28 is located in front of an occupant's chest or torso or, in other words, the second RFID tag 28 is positioned between the RFID reader 30 and the vehicle occupant as designated by reference Pb, as shown in FIG. 2. When the first RFID tag 26 is located on top of an occupant's lap, the first RFID tag 26 is located at a distance Da from the RFID reader 30. When the second RFID tag 28 is located in front of an occupant's chest or torso, the second RFID tag 28 is located a distance Db from the RFID reader 30.

An improperly seatbelted occupant will be determined by the control module 31 when the RFID tag 26 is located under an occupant's lap or, in other words, the RFID tag 26 is positioned between the vehicle occupant and the vehicle seat 32 as designated by reference $P_c$ and/or the second RFID tag 28 is located behind an occupant's chest or torso or, in other words, the second RFID tag 28 is positioned between the vehicle occupant and the vehicle seat 32 as designated by reference Pd, as in FIG. 2. When the first RFID tag 26 is located under an occupant's lap, the first RFID tag 26 is located a distance Dc from the RFID reader 30. When the second RFID tag 28 is located behind an occupant's chest or torso, the second RFID tag 28 is located a distance Dd from the RFID reader 30.

Distance Da is less than distance Dc. Thus, when first RFID tag 26 is located a distance Da from RFID reader 30, the RFID reader 30 detects the presence of first RFID tag 26. However, when first RFID tag 26 is located a distance Dc from RFID reader 30, the RFID reader 30 does not detect the presence of first RFID tag 26.

Distance Db is less than distance Dd. Thus, when second RFID tag 28 is located a distance Db from RFID reader 30, the RFID reader 30 detects the presence of second RFID tag 28. However, when second RFID tag 28 is located a distance Dd from RFID reader 30, the RFID reader 30 does not detect the presence of second RFID tag 28.

The second RFID 28 tag may also be positioned at reference Ps. At position Ps in FIG. 2, the vehicle occupant has placed the shoulder belt portion of the seatbelt webbing off the occupant's shoulder or under the occupant's arm. At position Ps, the second RFID tag 28 will be positioned a distance Ds from the RFID reader 30. At distance Ds the RFID reader 30 will not detect the second RFID tag 28 and the control module 31 will determine that the seatbelt webbing 14 is improperly routed.

Figure 3:
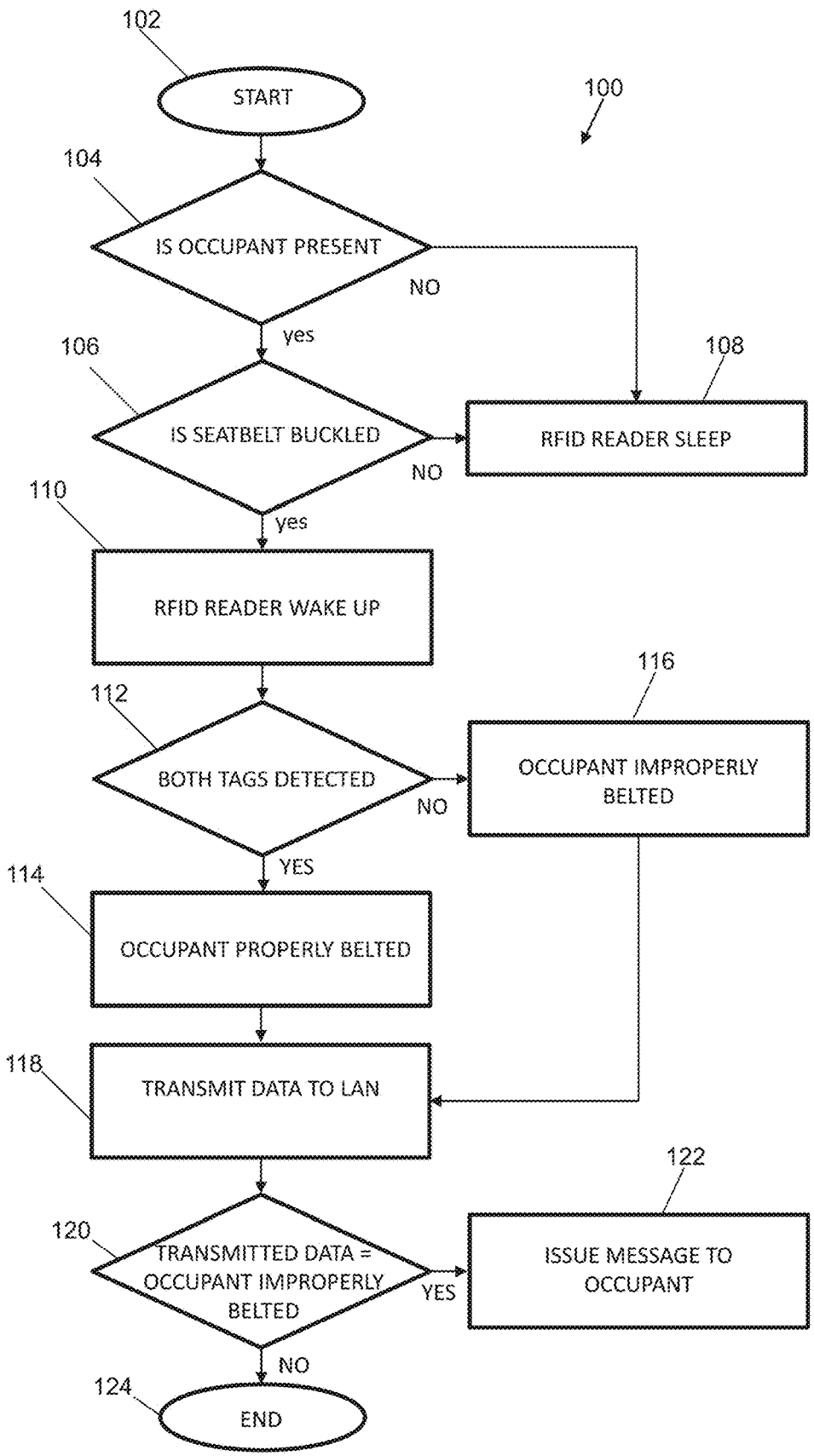
FIG. 3 is a flow chart illustrating a method for determining proper and improper seatbelt routing, according to an exemplary embodiment.

Referring now to FIG. 3, a flowchart illustrating a method 100 for detecting seatbelt routing is illustrated, in accordance with the present invention. More specifically, method 100 is configured to determine a properly seatbelted occupant, i.e. a properly routed seatbelt webbing 14, and improperly seatbelted occupant, i.e. an improperly routed seatbelt webbing 14. The method 100 starts at block 102. At block 104, a determination is made whether an occupant is present in the vehicle seat. If at block 104 a determination is made that the occupant is present in the vehicle seat, then the method 100 continues at block 106. However, if a determination is made that an occupant is not present in the vehicle seat, then the method 100 continues to block 108 where the RFID reader 30 goes to sleep or is powered down. At block 106 a determination is made whether the seatbelt is buckled. If at block 106 a determination is made that the seatbelt is buckled, the method 100 continues at block 110. At block 110 the RFID reader 30 wakes up and the method 100 continues to block 112. However, if at block 106 a determination is made that the seatbelt is not buckled, the method 100 continues to block 108. At block 108 the RFID reader 30 goes to sleep or is powered down.

At block 112 a determination is made whether first and second RFID tags 26, 28 are detected by the RFID reader 30. If at block 112 a determination is made that the first and second RFID tags 26, 28 are detected by the RFID reader 30, then the method continues to block 114. At block 114 a determination is made that the occupant is properly seatbelted. However, if at block 112 a determination is made that the first and second RFID tags 26, 28 are not detected by the RFID reader 30, then the method continues to block 116. At block 116 a determination is made that the occupant is improperly seatbelted and method 100 issues a message to the vehicle occupant. The message is either audible or visual and alters the occupant of a misrouted or improperly belted occupant. After block 114 or block 116 the method 100 continues to block 118. At block 118 the status of the seatbelt routing, i.e. occupant is properly or improperly belted, is transmitted to the vehicle local area network. After block 118 the method continues to block 120. At block 120, a determination is made whether the transmitted data to the vehicle LAN is that the status of the seatbelt routing is that the occupant is improperly belted. If at block 120 the determination is made that the transmitted data to the vehicle LAN is that the occupant is improperly belted then method 100 continues to block 122. At block 122, a message is issued to the occupant that their seatbelt is not properly routed. If at block 120 the determination is made that the transmitted data to the vehicle LAN is that the occupant is properly belted then method 100 continues to block 124.

In another embodiment of the present invention, a single RFID reader 30 is configured to read or detect RFID tags positioned on adjacent seatbelts of adjacent seats. Thus, the seatbelt routings of the seatbelts of more than one occupant may be detected using one RFID reader. In still another embodiment of the present invention, one RFID reader 30 is provided for each seatbelt and vehicle seat for reading or detecting the RFID tags attached to each seatbelt.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting seatbelt routing in a seatbelt system of a motor vehicle, the system comprising:
   a seatbelt retractor for releasably storing a length of seatbelt webbing;
   a guide loop for changing a routing direction of the seatbelt webbing;
   a seatbelt latchplate slidably engaged with the seatbelt webbing, wherein a lap belt portion of the seatbelt webbing is defined as the portion of seatbelt webbing extending between a terminal end of the seatbelt webbing and the latchplate and a shoulder portion of the seatbelt webbing is defined as the portion of the seatbelt webbing extending between the guide loop and the latchplate;
   a seatbelt buckle secured to the motor vehicle for releasable engaging the latchplate;

a seatbelt buckle sensor for detecting the presence of the latchplate in the seatbelt buckle;

a first radio frequency identification (RFID) tag attached to the seatbelt webbing of the of the seatbelt;

an RFID reader attached to a structural member of the motor vehicle for detecting the presence of the first RFID tag on the seatbelt webbing; and a control module for determining seatbelt routing based on whether the seatbelt is buckled and the detection of the first RFID tag by the RFID reader.

2. The system of claim 1, wherein the first RFID tag is attached to the lap belt portion of the seatbelt webbing.

3. The system of claim 1, further comprising a second RFID tag attached to the shoulder belt portion of the seatbelt webbing.

4. The system of claim 3, wherein the first RFID tag has a first RFID associated with the first RFID tag and the second RFID tag has a second RFID associated with the second RFID tag.

5. The system of claim 1, wherein the RFID reader is attached to the interior roof of the motor vehicle.

6. The system of claim 1, further comprising an occupant sensor for determining the presence of an occupant in the vehicle seat.

7. The system of claim 1, wherein the control module executes instructions to determine whether the first RFID is detected.

8. The system of claim 7, wherein the control module executes instructions to determine whether the second RFID is detected.

9. The system of claim 8, wherein the control module executes instructions to take an action when the first RFID is not detected.

10. The system of claim 9, wherein the action is issuing an audible or visual alter to the vehicle occupant.

11. The system of claim 10, wherein the control module executes instructions to take the action when the second RFID is not detected.

12. The system of claim 1, wherein the control module executes instructions to determine whether the first and second RFID tags are detected.

13. The system of claim 12, wherein the control module executes instructions to sense the presence of the first RFID tag.

14. The system of claim 12, wherein the control module executes instructions to determine that the seatbelt is on the lap of on an occupant when the presence of the first RFID tag is detected.

15. The system of claim 12, wherein the control module executes instructions to determine that the seatbelt is on the shoulder of on an occupant when the presence of the second RFID tag is detected.

16. A system for detecting seatbelt routing in a seatbelt system of a motor vehicle, the system comprising:

a seatbelt retractor for releasably storing a length of seatbelt webbing;

a guide loop for changing a routing direction of the seatbelt webbing;

a seatbelt latchplate slidably engaged with the seatbelt webbing, wherein a lap belt portion of the seatbelt webbing is defined as the portion of seatbelt webbing extending between a terminal end of the seatbelt webbing and the latchplate and a shoulder portion of the seatbelt webbing is defined as the portion of the seatbelt webbing extending between the guide loop and the latchplate;

a seatbelt buckle secured to the motor vehicle for releasable engaging the latchplate;

a seatbelt buckle sensor for detecting the presence of the latchplate in the seatbelt buckle;

a first radio frequency identification (RFID) tag attached to the lap belt portion of the seatbelt webbing;

a second RFID tag attached to the shoulder belt portion of the seatbelt webbing;

an RFID reader attached to a structural member of the motor vehicle for detecting the presence of the first RFID tag on the seatbelt webbing; and a control module for determining seatbelt routing based on whether the seatbelt is buckled and the detection of the first RFID tag by the RFID reader.

* * * * *